United States Patent
Hsieh

(10) Patent No.: US 11,409,452 B2
(45) Date of Patent: *Aug. 9, 2022

(54) INITIALIZATION METHODS AND ASSOCIATED CONTROLLER, MEMORY DEVICE AND HOST

(71) Applicant: SILICON MOTION INC., Hsinchu County (TW)

(72) Inventor: Chao-Kuei Hsieh, Hsinchu (TW)

(73) Assignee: SILICON MOTION INC., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/039,530

(22) Filed: Sep. 30, 2020

(65) Prior Publication Data

US 2021/0019065 A1 Jan. 21, 2021

Related U.S. Application Data

(63) Continuation of application No. 16/251,544, filed on Jan. 18, 2019, now Pat. No. 10,949,106.

(51) Int. Cl.
*G06F 3/06* (2006.01)
*G06F 13/42* (2006.01)

(52) U.S. Cl.
CPC .......... *G06F 3/0634* (2013.01); *G06F 3/0604* (2013.01); *G06F 3/0658* (2013.01);
(Continued)

(58) Field of Classification Search
None
See application file for complete search history.

(56) References Cited

U.S. PATENT DOCUMENTS

2005/0086434 A1 4/2005 Kang et al.
2005/0182881 A1 8/2005 Chou et al.
(Continued)

FOREIGN PATENT DOCUMENTS

CN 1471043 A 1/2004
CN 101620514 A 1/2010
(Continued)

OTHER PUBLICATIONS

Zhang Junpeng, "Research on Implementation of SD Card Controller Based on PCIE Bus" Modern Business Trade Industry, No. 9, 2012, 2 pages; Machine translation of abstract provided.
(Continued)

*Primary Examiner* — Jane Wei
(74) *Attorney, Agent, or Firm* — Duane Morris LLP

(57) ABSTRACT

The present invention provides a method performed by a secure digital (SD) card supporting both an SD mode and a peripheral component interconnect express (PCIe) mode for initializing the SD card. The method includes: (a) after receiving a first supply voltage through a first voltage supply pin from a host coupled to the SD card, entering the SD mode if the SD card is not in the PCIe mode and a CMD0 command for entering the SD mode is received through a command pin from the host coupled to the SD card; and (b) after receiving the first supply voltage through the first voltage supply pin from the host coupled to the SD card, performing a PCIe linkup process if the SD card is not in the SD mode and a second supply voltage is received through a second voltage supply pin from the host coupled to the SD card. The SD card enters the PCIe mode if the PCIe linkup process succeeds.

13 Claims, 9 Drawing Sheets

(52) U.S. Cl.
CPC .......... *G06F 3/0659* (2013.01); *G06F 3/0679* (2013.01); *G06F 13/4221* (2013.01); *G06F 2213/0026* (2013.01)

(56) References Cited

U.S. PATENT DOCUMENTS

| | | | |
|---|---|---|---|
| 2007/0055823 A1* | 3/2007 | Jo | G06F 13/387 |
| | | | 711/115 |
| 2008/0301355 A1 | 12/2008 | Wang | |
| 2010/0312933 A1 | 12/2010 | Chou et al. | |
| 2011/0040918 A1* | 2/2011 | Pinto | G06F 13/409 |
| | | | 710/301 |
| 2012/0159008 A1* | 6/2012 | Park | G06F 13/387 |
| | | | 710/15 |
| 2016/0062652 A1 | 3/2016 | Hia et al. | |
| 2016/0188245 A1* | 6/2016 | Thadi Suryaprakash | |
| | | | G06F 1/3287 |
| | | | 710/13 |
| 2018/0088865 A1 | 3/2018 | Lee | |
| 2018/0276177 A1* | 9/2018 | Shiau | G06F 13/4282 |
| 2018/0335971 A1 | 11/2018 | Borikar | |

FOREIGN PATENT DOCUMENTS

| | | |
|---|---|---|
| CN | 101697180 B | 7/2012 |
| CN | 102902489 A | 1/2013 |
| JP | 2017123156 A | 7/2017 |
| JP | 2018156506 A | 10/2018 |
| JP | 2018180769 A | 11/2018 |
| JP | 2018180770 A | 11/2018 |
| JP | 2019057229 A | 4/2019 |
| KR | 10-2018-0035333 A | 4/2018 |
| KR | 20180112831 A | 10/2018 |
| TW | I386946 B | 2/2013 |
| TW | I405087 | 8/2013 |
| TW | 201608467 A | 3/2016 |
| WO | 2006101057 A1 | 9/2006 |
| WO | 2018186456 A1 | 10/2018 |
| WO | 2018225327 A1 | 12/2018 |
| WO | 2019031295 A1 | 2/2019 |

OTHER PUBLICATIONS

Office Action in Korean Counterpart Application No. 10-2020-7014255, dated May 13, 2021, in 7 pages; English translation provided.
International Search Report for PCT Application PCT/CN2019/126694 filed on Dec. 19, 2019. pp. 1-10.
First Office Action and Search Report dated Mar. 27, 2020 for related TW patent Application No. 100101896 in 6 pages, Machine Translation provided.

* cited by examiner

| Pin # | SD Mode | | |
|---|---|---|---|
| | Name | Type[1] | Description |
| A1 | CD/DAT3[2] | I/O/PP[3] | Card Detect/ Data Line [Bit 3] |
| A2 | CMD | I/O/PP | Command/Response |
| A3 | VSS1 | S | Supply voltage ground |
| A4 | VDD | S | Supply voltage |
| A5 | CLK | I | Clock |
| A6 | VSS2 | S | Supply voltage ground |
| A7 | DAT0 | I/O/PP | Data Line [Bit 0] |
| A8 | DAT1[4] | I/O/PP | Data Line [Bit 1] |
| A9 | DAT2[5] | I/O/PP | Data Line [Bit 2] |

| Pin # | Name | Type | Description |
|---|---|---|---|
| B1 | PERST# | Input signal (active low) | PE-Reset is a functional reset to the card as defined by the PCIe Mini CEM specification. |
| B4 | VDD1 | Supply Voltage | 2.7V to 3.6V |
| B7 | REFCLK+ | Differential Signaling: Input | Clock Input |
| B8 | REFCLK- | Differential Signaling: Input | Clock Input |
| B9 | CLKREQ# | I/O (active low, open drain) | Reference clock request signal. Also used by L1 PM substates |
| B10 | VSS3 | Ground | |
| B11 | PCIe TX+ | Differential Signaling | Card Input |
| B12 | PCIe TX- | Differential Signaling | Card Input |
| B13 | VSS4 | Ground | |
| B14 | VDD2 | Supply Voltage 2 | 1.70V to 1.95V |
| B15 | PCIe RX- | Differential Signaling | Card Output |
| B16 | PCIe RX+ | Differential Signaling | Card Output |
| B17 | VSS5 | Ground | |
| B18 | VDD3 | Supply Voltage 3 | 1.14v to 1.30v |

INITIALIZATION METHODS AND ASSOCIATED CONTROLLER, MEMORY DEVICE AND HOST

BACKGROUND OF THE INVENTION

1. Field of the Invention

The present invention relates to a method for a memory device and a related controller, memory device and host, and more particularly, to an initialization method for a memory device and a related controller, memory device and host.

2. Description of the Prior Art

Along with the widespread use of digital communication devices or electronic devices for processing video data and/or music data, and the universalization of IA (Internet Appliance) products, various types of storage devices for storing digital data have been developed. Memory cards have become the mainstream product in the market because of the advantages of compact volume, low power consumption and large storage capability. The memory cards are quite suitable for use in various types of hosts/devices/systems, such as digital cameras, digital video cameras, MP3 players, mobile phones, personal digital assistants (PDA) or global positioning system (GPS) devices.

Secure digital (SD) cards are popular memory cards in the market. Since the amount of data transmission has increased significantly in recent years, new transmission buses supporting higher speeds, such as peripheral component interconnect express (PCIe) buses, are used in SD cards to replace traditional SD buses. Therefore, there is a need to provide SD cards which can operate in either an SD mode or a PCIe mode, and there is also a need to provide initialization methods for such SD cards.

SUMMARY OF THE INVENTION

Hence, one objective of the present invention is to provide an initialization method capable of initializing an SD card which supports both an SD transmission mode and a PCIe transmission mode, and provide related SD cards, controllers of the SD cards and hosts.

An embodiment of the present invention discloses a method performed by a secure digital (SD) card supporting both an SD mode and a peripheral component interconnect express (PCIe) mode for initializing the SD card. The SD card comprises at least 17 pins for coupling to a host. The at least 17 pins comprises: a first voltage supply pin for receiving a first supply voltage provided by the host; a second voltage supply pin for receiving a second supply voltage provided by the host, wherein the second supply voltage is lower than the first supply voltage; at least one ground pin for coupling to a ground; at least one clock pin for receiving a clock signal from the host; and a command pin for receiving a command from the host. The method comprises: (a) after receiving the first supply voltage through the first voltage supply pin from the host coupled to the SD card, entering the SD mode if the SD card is not in the PCIe mode and a CMD0 command for entering the SD mode is received through the command pin from the host coupled to the SD card; and (b) after receiving the first supply voltage through the first voltage supply pin from the host coupled to the SD card, performing a PCIe linkup process if the SD card is not in the SD mode and the second supply voltage is received through the second voltage supply pin from the host coupled to the SD card. The SD card enters the PCIe mode if the PCIe linkup process succeeds.

Another embodiment of the present invention discloses an SD card supporting both an SD mode and a PCIe mode. The SD card comprises at least 17 pins for coupling to a host and a controller. The at least 17 pins comprises a first voltage supply pin for receiving a first supply voltage provided by the host; a second voltage supply pin for receiving a second supply voltage provided by the host, wherein the second supply voltage is lower than the first supply voltage; at least one ground pin for coupling to a ground; at least one clock pin for receiving a clock signal from the host; and a command pin for receiving a command from the host. The controller is configured to: after receiving the first supply voltage through the first voltage supply pin from the host coupled to the SD card, set the SD card to the SD mode if the SD card is not in the PCIe mode and a CMD0 command for entering the SD mode is received through the command pin from the host connected to the SD card; and after receiving the first supply voltage through the first voltage supply pin from the host coupled to the SD card, perform a PCIe linkup process if the SD card is not in the SD mode and the second supply voltage is received through the second voltage supply pin. The SD card enters the PCIe mode if the PCIe linkup process succeeds.

Another embodiment of the present invention discloses a method performed by a host for initializing a secure digital (SD) card coupling to the host. The SD card supports both an SD mode and a peripheral component interconnect express (PCIe) mode. The host comprises a processor and a communication interface for coupling to the SD card. The communication interface comprises: a first voltage supply contact for providing a first supply voltage; a second voltage supply contact for providing a second supply voltage lower than the first supply voltage; at least one ground contact for coupling to a ground; at least one clock contact for transmitting a clock signal to the SD card; and a command contact for transmitting a command to the SD card. The method comprises (a) providing the first supply voltage to the SD card through the first voltage supply contact; (b) providing the second supply voltage to the SD card through the second voltage supply contact; (c) performing a PCIe linkup process after step (b); (d) determining that the PCIe linkup process succeeds or fails, wherein if the PCIe linkup process succeeds, the SD card enters the PCIe mode; and (e) transmitting a CMD0 command for entering the SD mode to the SD card through the command contact if the PCIe linkup process fails.

Another embodiment of the present invention discloses a host for initializing a secure digital (SD) card coupled to the host. The SD card supports both an SD mode and a peripheral component interconnect express (PCIe) mode. The host comprises a processor and a communication interface for coupling to the SD card. The communication interface comprises: a first voltage supply contact for providing a first supply voltage; a second voltage supply contact for providing a second supply voltage lower than the first supply voltage; at least one ground contact for coupling to a ground; at least one clock contact for transmitting a clock signal to the SD card; and a command contact for transmitting a command to the SD card. The processor is configured to: provide the first supply voltage to the SD card through the first voltage supply contact; provide the second supply voltage to the SD card through the second voltage supply contact; perform a PCIe linkup process after providing the second supply voltage; determine that the PCIe linkup process succeeds or fails, wherein if the PCIe linkup process succeeds, the SD card enters the PCIe mode; and transmit a CMD0 command for entering the SD mode to the SD card through the command contact if the PCIe linkup process fails.

Yet another embodiment of the present invention discloses a method performed by a host for initializing a secure digital (SD) card coupled to the host. The SD card supports both an SD mode and a peripheral component interconnect express (PCIe) mode. The host comprises a processor and a communication interface for coupling to the SD card. The communication interface comprises: a first voltage supply contact for providing a first supply voltage; a second voltage supply contact for providing a second supply voltage lower than the first supply voltage; at least one ground contact for coupling to a ground; at least one clock contact for transmitting a clock signal to the SD card; and a command contact for transmitting a command to the SD card. The method comprises: (a) providing the first supply voltage to the SD card through the first voltage supply contact; (b) transmitting a CMD0 command for entering the SD mode through the command contact to the SD card after step (a); (c) transmitting a CMD8 command for entering the PCIe mode through the command contact to the SD card after step (b), wherein the SD card remains in the SD mode if a response signal, indicating that the SD card supports the PCIe mode, is not received through the command contact from the SD card; (d) if the response signal, indicating that the SD card supports the PCIe mode, is received from the SD card, providing the second supply voltage to the SD card through the second voltage supply contact; (e) performing a PCIe linkup process after step (d); (f) determining that the PCIe linkup process succeeds or fails, wherein if the PCIe linkup process succeeds, the SD card enters the PCIe mode; and (g) if the PCIe linkup process fails, transmitting a CMD0 command to the SD card through the command contact.

Yet another embodiment of the present invention discloses a host for initializing a secure digital (SD) card coupled to the host. The SD card supports both an SD mode and a peripheral component interconnect express (PCIe) mode. The host comprises a processor and a communication interface for coupling to the SD card. The communication interface comprises: a first voltage supply contact for providing a first supply voltage; a second voltage supply contact for providing a second supply voltage lower than the first supply voltage; at least one ground contact for coupling to a ground; at least one clock contact for transmitting a clock signal to the SD card; and a command contact for transmitting a command to the SD card. The processor is configured to: provide the first supply voltage to the SD card through the first voltage supply contact; transmit a CMD0 command for entering the SD mode through the command contact to the SD card after providing the first supply voltage; transmit a CMD8 command for entering the PCIe mode through the command contact to the SD card after transmitting the CMD0 command, wherein the SD card remains in the SD mode if a response signal, indicating that the SD card supports the PCIe mode, is not received through the command contact from the SD card; if the response signal, indicating that the SD card supports the PCIe mode, is received from the SD card, provide the second supply voltage to the SD card through the second voltage supply contact; perform a PCIe linkup process after providing the second supply voltage; determine that the PCIe linkup process succeeds or fails, wherein if the PCIe linkup process succeeds, the SD card enters the PCIe mode; and if the PCIe linkup process fails, transmit a CMD0 command to the SD card through the command contact.

Yet another embodiment of the present invention discloses a method performed by a controller of a secure digital (SD) card supporting both an SD mode and a peripheral component interconnect express (PCIe) mode for initializing the SD card. The SD card comprises at least 17 pins for coupling to a host. The at least 17 pins comprise: a first voltage supply pin for receiving a first supply voltage for SD mode provided by the host; a second voltage supply pin for receiving a second supply voltage provided by the host, wherein the second supply voltage is lower than the first supply voltage; at least one ground pin for coupling to a ground; at least one clock pin for receiving a clock signal from the host; and a command pin for receiving a command from the host. The method comprises: (a) after receiving the first supply voltage through the first voltage supply pin, setting the SD card to the SD mode if the SD card is not in the PCIe mode and a CMD0 command for entering the SD mode is received through the command pin; and (b) after receiving the first supply voltage through the first voltage supply pin, letting the SD card perform a PCIe linkup process if the SD card is not in the SD mode and the second supply voltage is received through the second voltage supply pin; and (c) setting the SD card to the PCIe mode if the PCIe linkup process succeeds.

Yet another embodiment of the present invention discloses a controller of a secure digital (SD) card, configured to perform the above method.

The objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a table of descriptions of the pins of an SD card in accordance with some embodiments of the present invention.

DETAILED DESCRIPTION

Figures 1, 2:
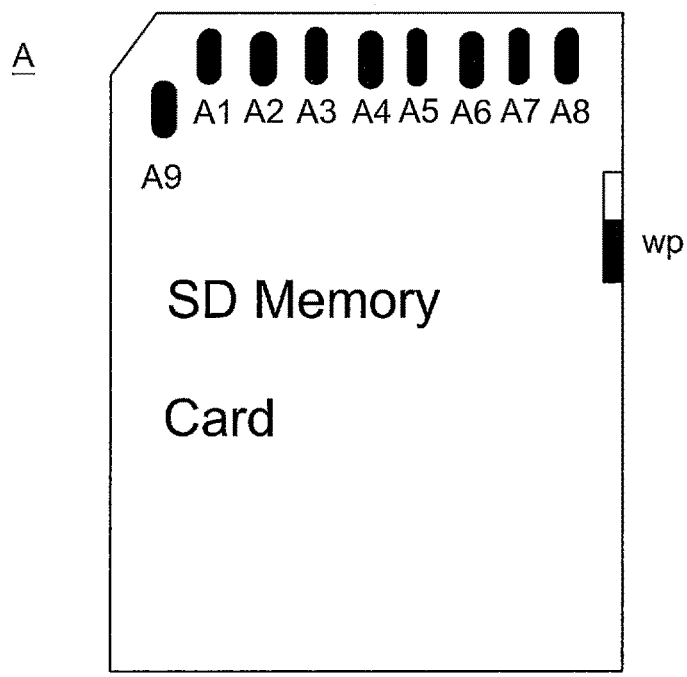
FIG. 1 is a schematic diagram of an SD card.
FIG. 2 is a table of descriptions of the pins of an SD card.

FIG. 1 is a top view of an SD card A. As shown in FIG. 1, SD card A includes 9 pins, which are labeled A1 to A9 and form a single row. SD card A operates in an SD transmission mode (or referred to as an "SD mode").

FIG. 2 is a table of descriptions or definitions of pins A1 to A9 of the SD card A shown in FIG. 1. As shown in the table, pins A1 and A7 to A9 are data lines. Pin A2 is referred to as a command (CMD) pin. For example, pin A2 may receive a command transmitted from a host to SD card A and may transmit a response in response to the command from SD card A to the host. Pin A4 is referred to as a VDD pin and operates as a voltage supply pin for SD card A. Pin A4 may be configured to receive a supply voltage within a range from 2.7 to 3.6 volts (V). Pin A5 is referred to as a clock (CLK) pin and is configured to receive a clock signal. Pins A3 and/or A6 are ground pins.

Figure 3:
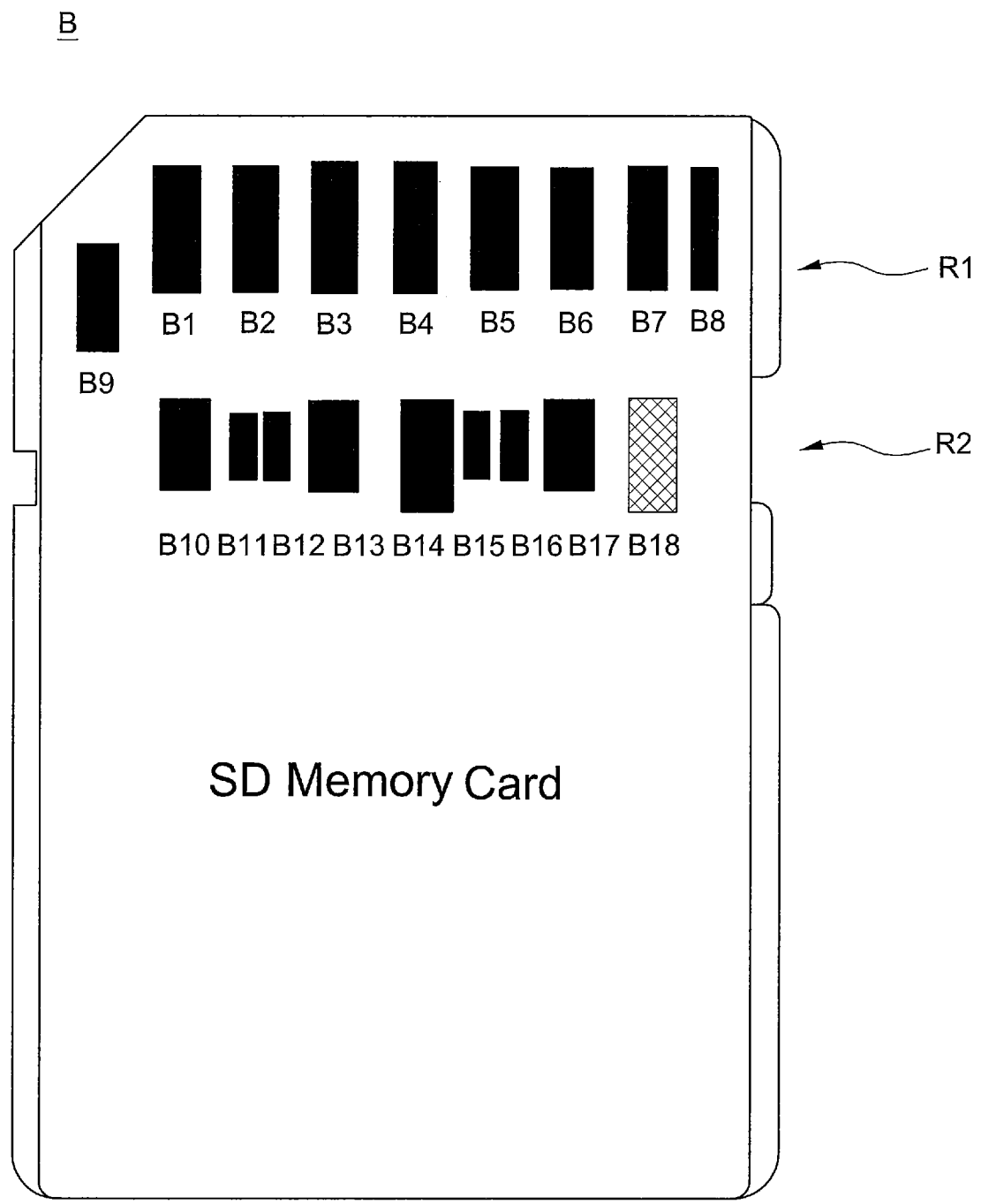
FIG. 3 is a schematic diagram of an SD card in accordance with some embodiments of the present invention.

FIG. 3 shows an SD card B in accordance with some embodiments of the present invention. As shown in FIG. 3, SD card B includes 18 pins, which are labeled B1 to B18 and form two rows R1 and R2. The arrangements or configurations of row R1, formed by pins B1 to B9, are substantially the same as those of pins A1 to A9 of SD card A in FIG. 1. According to the present disclosure, SD card B may operate in both an SD mode and a PCIe mode. When SD card B operates in the SD mode, pins B1 to B9 are utilized and have the same functions as pins A1 to A9 of SD card A in FIG. 1. In this situation, pins B1 to B9 correspond to pins A1 to A9 respectively. For example, pin B2 operates as a command pin.

FIG. 4 is a table of descriptions or definitions of pins B1, B4 and B7 to B18 of SD card B when SD card B operates in the PCIe mode. Pins B1, B4 and B7 to B9, which are utilized in the SD mode, are also utilized in the PCIe mode. Nevertheless, the functions of pins B1 and B7 to B9 in the PCIe mode are different from the functions of pins B1 and B7 to B9 in the SD mode.

As shown in FIG. 4, pin B4 is referred to as a VDD1 pin and operates as a voltage supply pin for SD card B (as pin A4 for SD card A). Pin B4 may be configured to receive a supply voltage within a range from 2.7 to 3.6V. Pin B14 is referred to as a VDD2 pin and operates as a voltage supply pin for SD card B. Pin B14 may be configured to receive a supply voltage within a range from 1.7 to 1.95V. Pin B18 is referred to as a VDD3 pin and operates as a voltage supply pin for SD card B. Pin B18 may be configured to receive a supply voltage within a range from 1.14 to 1.3V. In some embodiments, Pin B18 may be optional and may not be functional. Pins B7 and B8 are referred to as clock (CLK) pins and may be configured to receive clock signals. Pins B10, B13 and/or B17 are ground pins.

Figure 5:
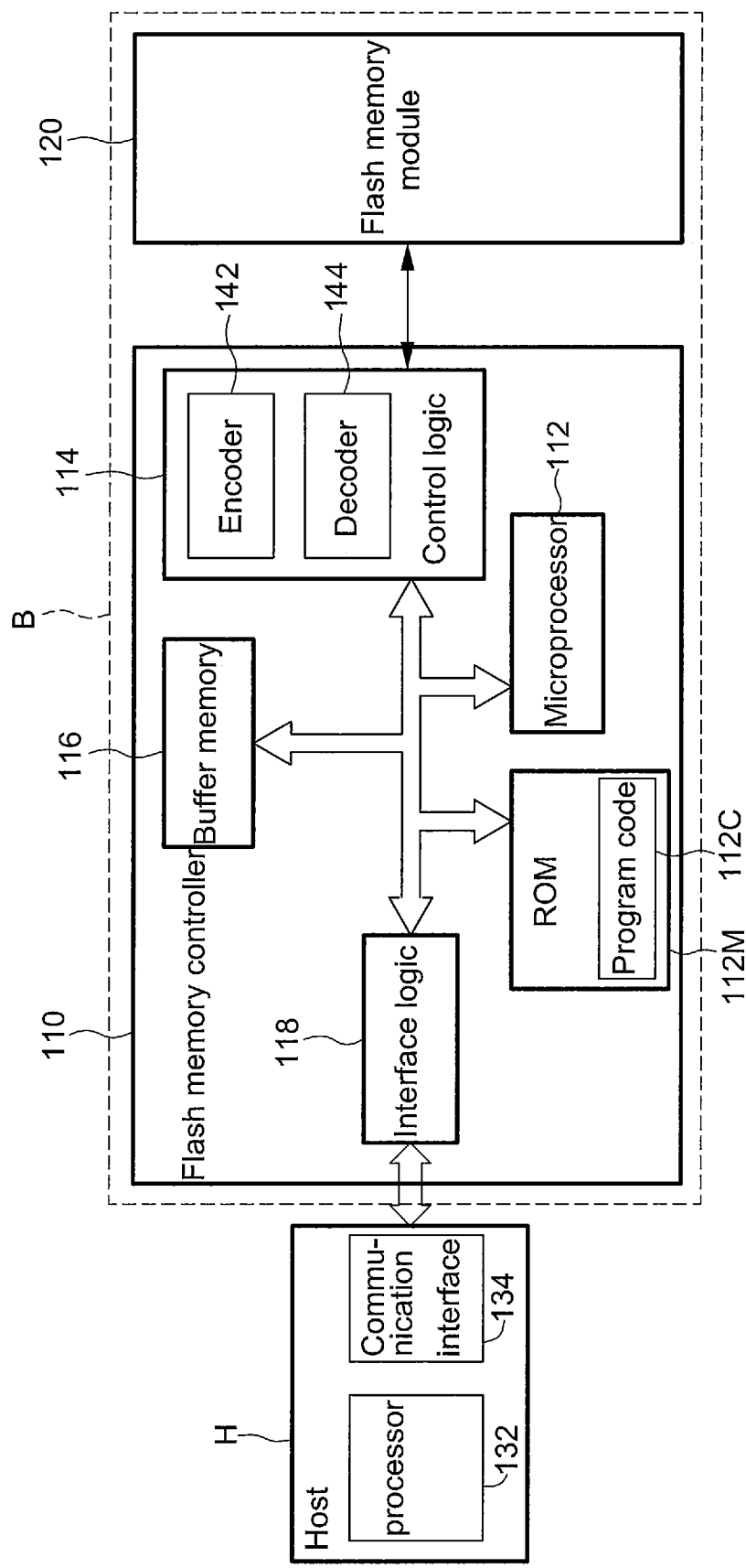
FIG. 5 is a block diagram showing the combination of an SD card and a host in accordance with some embodiments of the present invention.

FIG. 5 is a block diagram showing the combination of SD card B and a host H in accordance with some embodiments of the present invention. SD card B is configured to be coupled with the host H via pins B1 to B18, and receives commands, data, and supply voltages from the host H via pins B1 to B18. SD card B includes a flash memory module 120 and a flash memory controller (or controller) 110, wherein the flash memory controller 110 is arranged to access the flash memory module. The flash memory controller 110 may be configured to set the transmission mode of SD card B as the SD mode or the PCIe mode. According to this embodiment, the flash memory controller 110 comprises a microprocessor 112, a read-only memory (ROM) 112M, a control logic 114, a buffer memory 116, and an interface logic 118. The ROM 112M is arranged to store a program code 112C, and the microprocessor 112 is arranged to execute the program code 112C in order to control the access to the flash memory module 120. The control logic 114 comprises an encoder 142 and a decoder 144.

Typically, the flash memory module 120 comprises multiple flash memory chips, each comprising multiple blocks, and the flash memory controller 110 takes a "block" as the unit of performing operations (e.g. erasing) on the flash memory module 120. The flash memory controller 110 may execute the program code 112C via the microprocessor 112. Further, a block may include a specific number of pages, wherein the flash memory controller 110 takes a "page" as the unit of writing data to the flash memory module 120. In some embodiments, the flash memory module 120 may include a 3D NAND-type flash memory.

In practice, the flash memory controller 110 which executes the program code 112C via the microprocessor 112 may use the inner elements thereof to perform various control operations, such as using the control logic 114 to control the access operations of the flash memory module 120 (especially the access operation on at least one block or at least one page), using the buffer memory 116 to perform the required buffering process, and using the interface logic 118 to communicate with the host H via pins B1 to B18 shown in FIG. 3. The buffer memory 116 may, for example, be a static random access memory (Static RAM (SRAM)), but the present invention is not limited thereto.

Figure 6:
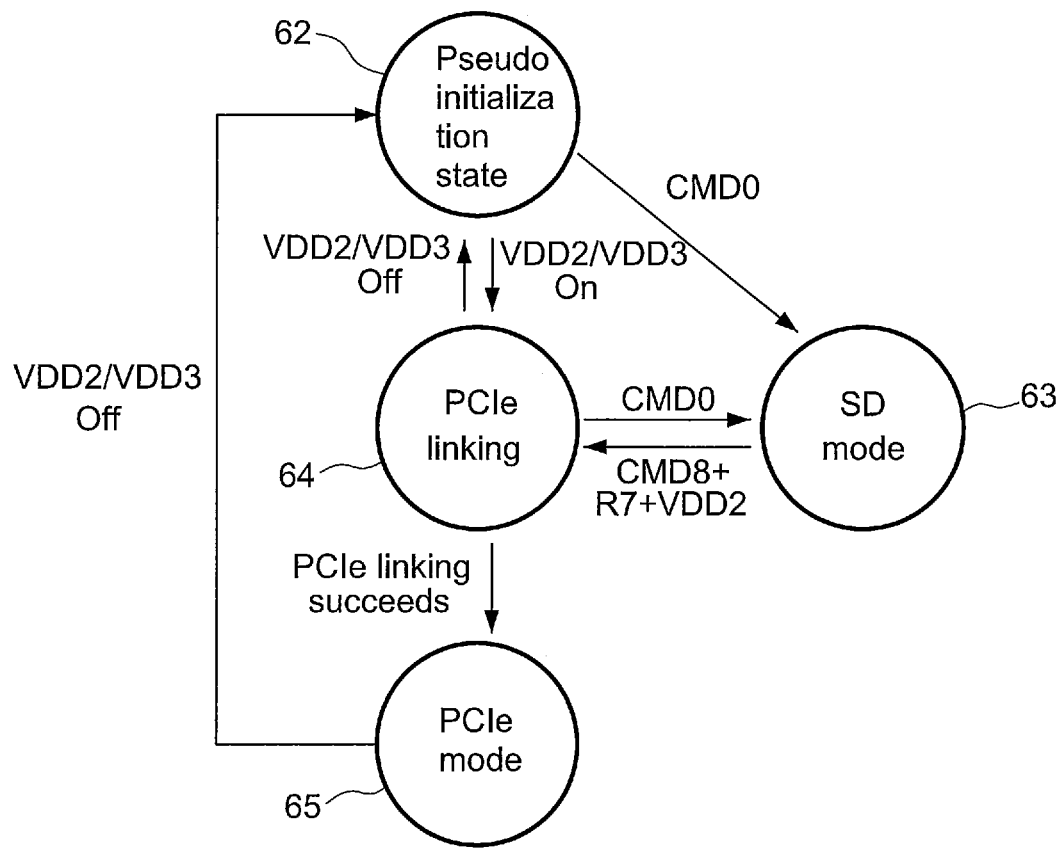
FIG. 6 is a state diagram showing the changes in the state of an SD card during initialization in accordance with some embodiments of the present invention.

FIG. 6 is a state diagram showing changes in the state an SD card during initialization in accordance with some embodiments of the present invention. There are various states shown in FIG. 6, which are the operation states of SD card B during initialization when SD card B is connected (coupled) to the host H. The state diagram starts with a pseudo initialization state 62. When SD card B is connected to the host H, a voltage VDD1 is provided to SD card B through pin B4. SD card B thus enters the pseudo initialization state 62.

In state 62, if a voltage VDD2 is received through pin B14 or a voltage VDD3 is received through pin B18, SD card B (or the controller 110) enters state 64 for performing a PCIe linkup process. If voltage VDD2 through pin B14 and voltage VDD3 through the VDD3 pin B18 are both absent and a CMD0 command of the SD mode is received through command pin B2 from the host H, SD card B enters the SD mode. That is, SD card B enters state 63 from state 62. CMD0 is a software reset command and sets SD card B into an idle state regardless of the current card state. Detailed information of CMD0 is included in the "Physical Layer Specification" released by the SD Group.

As mentioned above, if voltage VDD2 or VDD3 is received, SD card B (or the controller 110) enters state 64. In state 64, a PCIe linkup process is performed by the controller. If, during the linkup process, SD card B (or the controller 110) detects that pin B1 (e.g., RERST #) is low, SD card B (or the controller 110) disables its internal pull-up resistor on pin B1 and then drives pin B9 (e.g., CKLREQ #) low. If the host H detects that pin B9 is low, the host H drives pin B1 high and then executes PCIe link training and initialization. Detailed description of the linkup process is included in Section 8.3, "Initialization Process of SD Express Card," of the "Physical Layer Specification" released by the SD Group.

In state 64, if the PCIe linkup process succeeds, SD card B (or the controller 110) enters the PCIe mode or is set to the PCIe mode by the controller 110, which is labeled state 65. If, before the PCIe linkup process succeeds, the existing voltage VDD2 or voltage VDD3 is turned off (i.e., both voltage VDD2 and voltage VDD3 are absent), SD card B (or the controller 110) terminates the PCIe linkup process and returns to the pseudo initialization state (i.e., state 62).

If, during the PCIe linkup process, the CMD0 command is received through command pin B2 from the host H, SD card B enters the SD mode or is set to the SD mode by the controller 110 (state 63). The PCIe linkup process may be considered by the host H to have failed if the PCIe linkup process cannot succeed within a predetermined time period. In some embodiments, the host H may be configured to transmit a CMD0 command to SD card B through command pin B2 if the PCIe linkup process fails. In some other embodiments, the host H may be configured to turn off voltage VDD2 and voltage VDD3 if the PCIe linkup process fails.

If SD card B has entered the PCIe mode (i.e., state 65) and the existing voltage VDD2 or VDD3 is turned off (i.e., voltage VDD2 and voltage VDD3 are both absent), SD card B returns to the pseudo initialization state or is set back to the pseudo initialization state by the controller 110 (back to state 62).

In state 63, where SD card B has entered the SD mode, a CMD8 command may be received through command pin B2 from the host H. CMD 8 command is added to support multiple voltage ranges and used to check whether the SD card supports the supplied voltage. The host H uses CMD8 command to provide voltage supporting information to the SD card. Upon receipt of CMD8 command, SD card B (or the controller 110) may transmit a response signal (i.e., R7) to the host through command pin B2, in order to provide voltage supporting information of the SD card to the host. In the response, the SD cards echoes back both the voltage range and check pattern set in the argument. Detailed information of R7 is included in the Section 4.9.6 of "Physical Layer Specification Version 7.00" released by the SD Group. Afterward, if voltage VDD2 through pin B14 or voltage VDD3 through pin B18 is received from the host H, SD card B (or the controller 110) performs the PCIe linkup process (state 64); if neither, SD card B remains in the SD mode.

In the above embodiments, SD card B (or the controller 110) enters the SD mode from state 62 if the CMD0 command of the SD mode is received through command pin B2 from the host H. Nevertheless, in some other embodiments, SD card B (or the controller 110) enters the SD mode from state 62 if the SD card is not in the PCIe mode and an SD clock signal is received through command pin B5 from the host H. It is appreciated that, in some embodiments, pin B18 is not arranged and thus VDD3 would not be provided.

Figure 7:
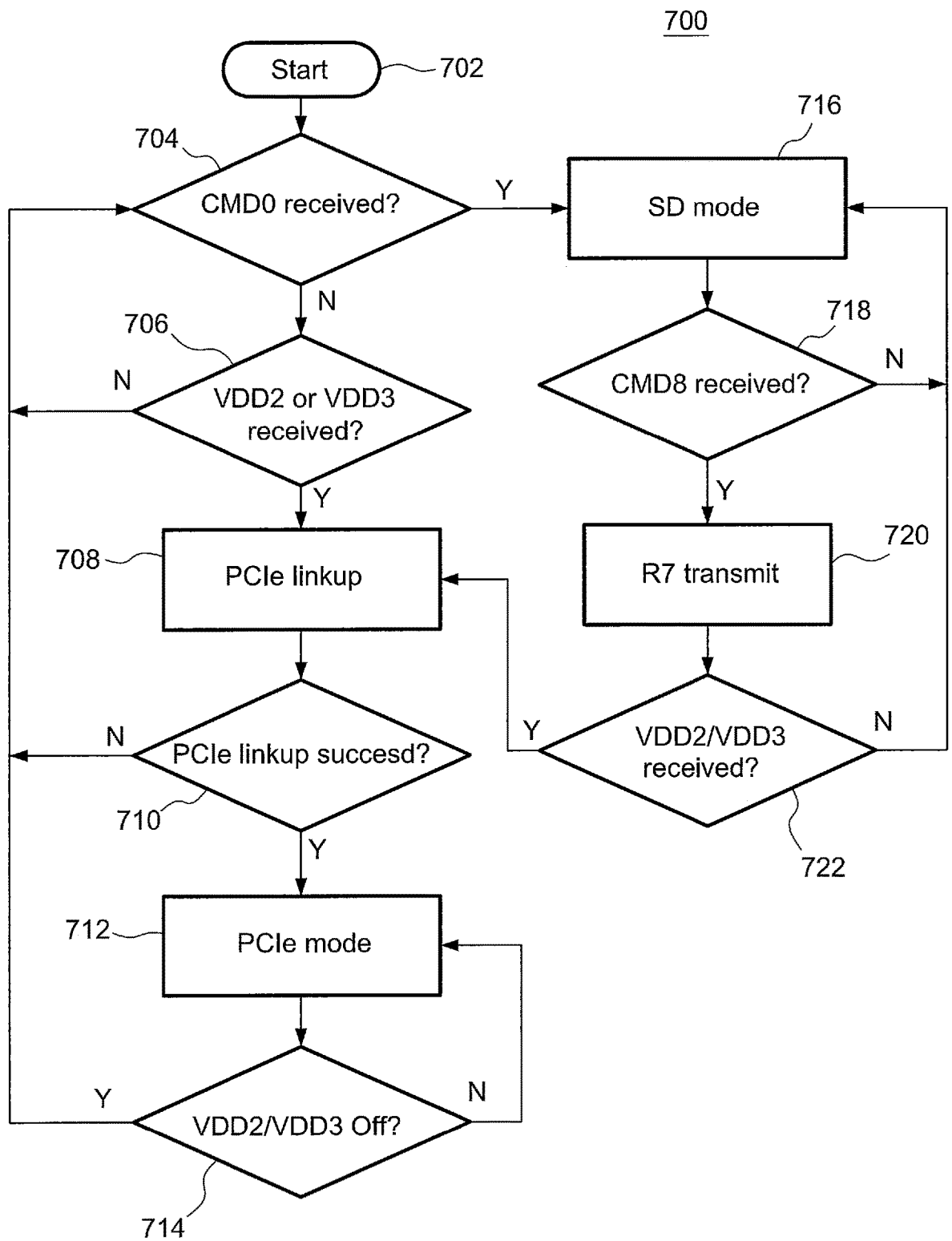
FIG. 7 is a flow chart of an initialization method of an SD card in accordance with some embodiments of the present invention.

FIG. 7 is a flow chart of an initialization process 700 performed by an SD card or a controller of the SD card in accordance with some embodiments of the present invention.

The detailed steps are as follows:

Step 702: Start

Step 704: The SD card (or the controller) determines whether a CMD0 command is received through the command pin. If the result is affirmative, the process goes to Step 716. If the result is negative, the process goes to Step 706.

Step 706: The SD card (or the controller) determines whether a voltage VDD2 or a voltage VDD3 is received. If the result is affirmative, the process goes to Step 708. If the result is negative, the process goes to Step 704.

Step 708: The SD card (or the controller) performs a PCIe linkup process.

Step 710: The SD card (or the controller) determines whether the PCIe linkup process succeeds. If the result is affirmative, the process goes to Step 712. If the result is negative (i.e., if the PCIe linkup process fails), the process goes to Step 704. The PCIe linkup process may be deemed to have failed if one of the following events happens: (i) the PCIe linkup process cannot succeed within a predetermined time period; (ii) voltage VDD2 and voltage VDD3 are both absent; and (iii) a CMD0 command is received.

Step 712: The SD card enters the PCIe mode or is set to the PCIe mode by the controller.

Step 714: The SD card (or the controller) determines whether the existing voltage VDD2 or VDD3 is turned off (i.e., voltage VDD2 and voltage VDD3 are both absent). If the result is affirmative, the process goes to Step 704. If the result is negative, the process goes to Step 712, wherein the SD card remains in the PCIe mode.

Step 716: The SD card enters the SD mode or is set to the SD mode by the controller.

Step 718: The SD card (or the controller) determines whether a CMD8 command is received through the command pin. If the result is affirmative, the process goes to Step 720. If the result is negative, the process goes to Step 716, wherein the SD card remains in the SD mode.

Step 720: The SD card transmits a response signal (e.g., R7), indicating that the SD card supports the PCIe mode, through the command pin.

Step 722: The SD card (or the controller) determines whether voltage VDD2 or voltage VDD3 is received. If the result is affirmative, the process goes to Step 708. If the result is negative, the process goes to Step 716, wherein the SD card remains in the SD mode.

Persons skilled in the art would understand from the above disclosure that the order of the above steps may be adjusted. For example, Step 706 may be performed before Step 704. If no neither VDD2 nor Vdd3 is received in Step 706, then go to Step 704.

According to the present disclosure, especially the disclosure related to FIGS. 6 and 7, persons with ordinary skills in the art may derive other flow charts of an initialization process performed by an SD card or a controller of the SD card. Thus, the initialization process of the subject invention is not limited to that shown in FIG. 7.

Referring to FIG. 5 again, the host H may include a processor 132 and a communication interface 134 for coupling to the SD card. The communication interface includes contacts H1 to H18, wherein contacts H1 to H18 correspond respectively to the pins B1 to B18 of SD card B. The functions of contacts H1 to H18 are as shown in FIG. 2 when the host H would like to communicate with SD card B in the SD mode, and the functions of contacts H1 to H18 are as shown in FIG. 4 when the host H would like to communicate with SD card B in the PCIe mode. The operation of the host H for conducting initialization is detailed in the following paragraphs. Generally, the processor 132 of the host H runs at least a program code that can be accessed by processor 132 to conduct the following initialization processes, including FIG. 8, FIG. 9, and FIG. 10. In other words, the host H is configured to perform the following initialization processes.

Figure 8:
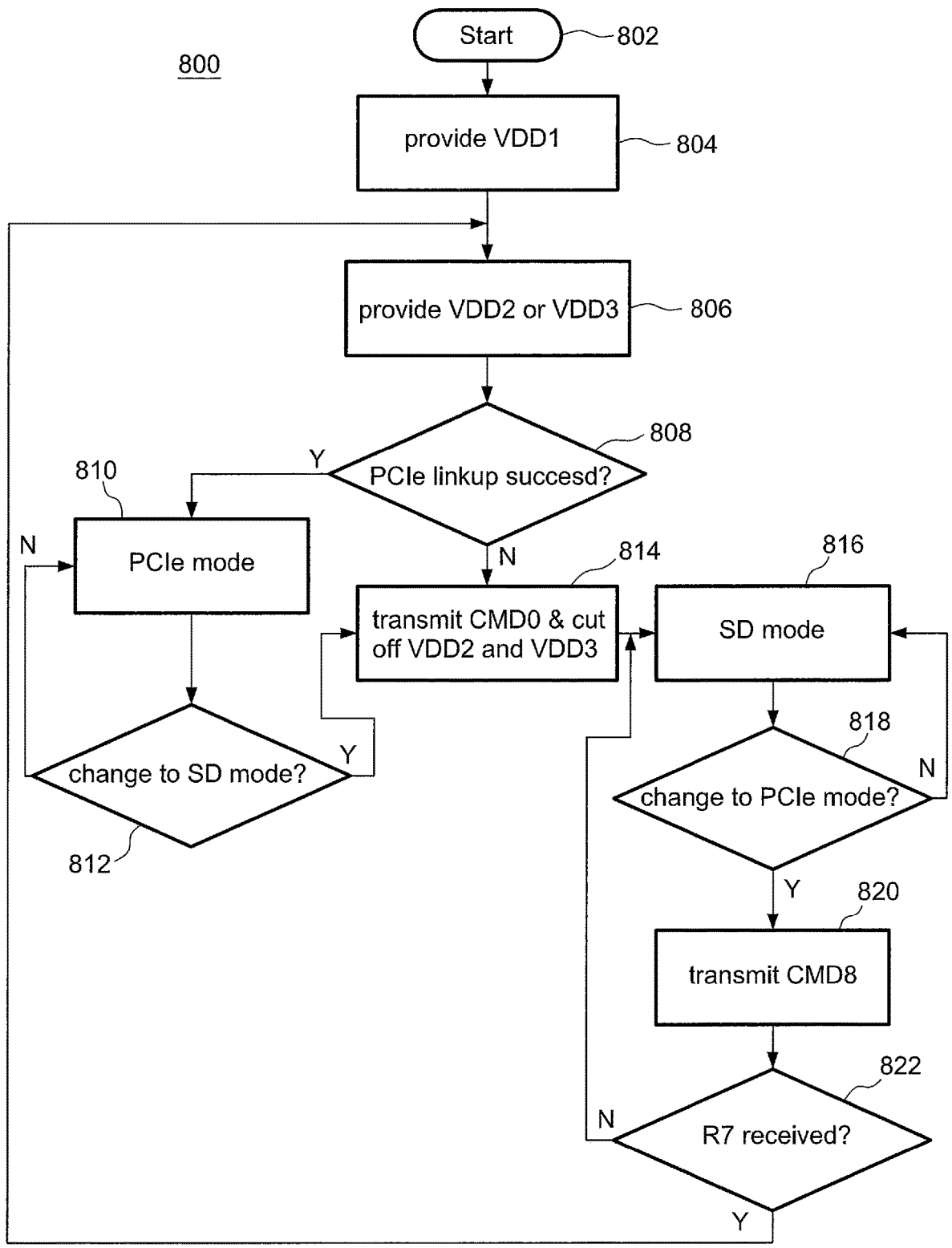
FIG. 8 is a flow chart of an initialization method of a host in accordance with some embodiments of the present invention.

FIG. 8 is a flow chart of an initialization process performed by a host in accordance with some embodiments of the present invention. According to a preferred embodiment, the initialization process includes the following steps:

Step 802: Start

Step 804: The host provides VDD1 through contact H4 to the SD card.

Step 806: The host provides VDD2 through contact H14 or provides VDD3 through the contact H18 to the SD card.

Step 808: The host conducts a PCIe linkup process and determines whether a response indicating that the PCIe linkup process succeeds is received. If the result is affirmative, the process goes to Step 810. If the result is negative (i.e., if the PCIe linkup process fails), the process goes to Step 814. If the PCIe linkup process succeeds, a register "PCIe Linkup" is set to 1b. That is, the host can determine whether the PCIe linkup process succeeds by determining the value of register "PCIe Linkup."

Step 810: The host determines that the SD card is in the PCIe mode.

Step 812: The host determines whether a command requesting the SD card to switch to the SD mode is received. If the result is affirmative, the process goes to Step 814. If the result is negative, the process goes to Step 810.

Step 814: The host transmits a CMD0 command through the contact H2 and cuts off both VDD2 and VDD3.

Step 816: The host determines that the SD card is in the SD mode.

Step 818: The host determines whether a command requesting the SD card to switch to the PCIe mode is received. If the result is affirmative, the process goes to Step 820. If the result is negative, the process goes to Step 816.

Step 820: The host transmits CMD8 command through the contact H2.

Step 822: The host determines whether a response signal (e.g., R7), indicating that the SD card supports the PCIe mode, is received through the contact H2. If the result is affirmative, the process goes to Step 806. If the result is negative, the process goes to Step 816.

In the initialization process 800, the host provides VDD1 and then provides VDD2 or VDD3. The host then performs the PCIe linkup process with the SD card. If the PCIe linkup process fails, the host determines that the SD card coupled to the host may not support the PCIe mode and then transmits the CMD0 command in order to let the SD card enter the SD mode. If the PCIe linkup process succeeds, the SD card enters the PCIe mode.

In the above embodiment, the host provides VDD2 or VDD3 after VDD1. In some embodiments steps 804 and 806 may be performed simultaneously. That is, the host may provide VDD2 or VDD3 along with VDD1. Persons skilled in the art would understand from the above disclosure that the order of the above steps may be adjusted and the initialization process is not limited to the above embodiments.

Figure 9:
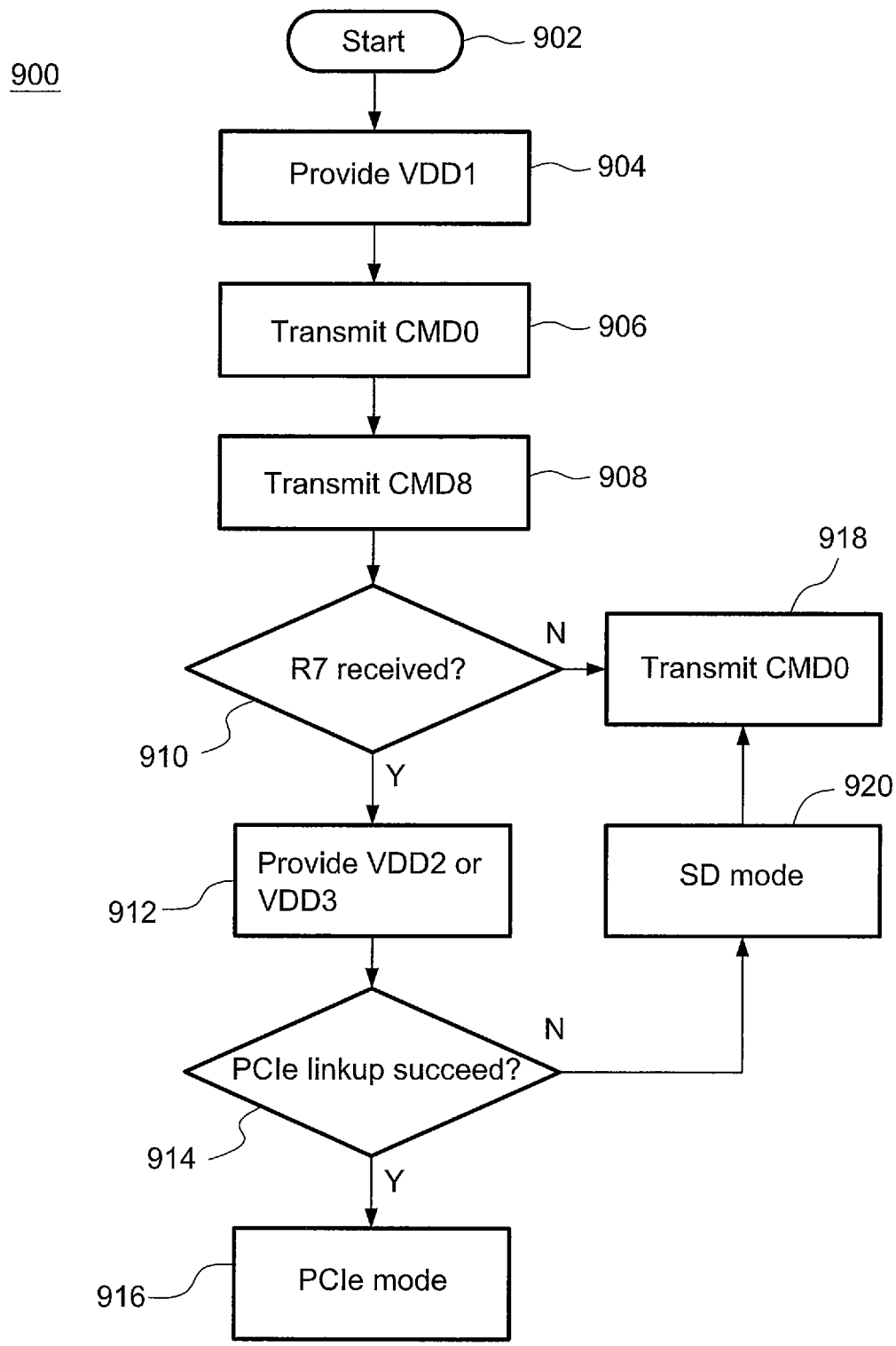
FIG. 9 is a flow chart of another initialization method of a host in accordance with some embodiments of the present invention.

FIG. 9 is a flow chart of another initialization process performed by a host in accordance with some embodiments of the present invention.

According to a preferred embodiment, the initialization process 900 includes the following steps:

Step 902: Start.

Step 904: The host provides VDD1 through contact H4 to the SD card.

Step 906: The host transmits a CMD0 command through the contact H2 to the SD card.

Step 908: The host transmits CMD8 command through the contact H2 to the SD card.

Step 910: The host determines whether a response signal (e.g., R7), indicating that the SD card supports the PCIe mode, is received. If the result is affirmative, the process goes to Step 912. If the result is negative, the process goes to Step 918.

Step 912: The host provides VDD2 through contact H14 or provides VDD3 through the contact H18 to the SD card.

Step 914: The host performs a PCIe linkup process with the SD card and determines whether the PCIe linkup process succeeds. If the result is affirmative, the process goes to Step 916. If the result is negative (i.e., if the PCIe linkup process fails), the process goes to Step 920.

Step 916: The host determines that the SD card is in the PCIe mode.

Step 918: The host transmits a CMD0 command through the contact H2 to the SD card.

Step 920: The host determines that the SD card is in the SD mode.

In the initialization process 900, the host provides VDD1 and then transmits CMD0 command to the SD card. Thus, the SD card would enter the SD mode after booting up. The host then transmits CMD8 command to the SD card to confirm whether the SD card supports the PCIe mode. If the SD card transmits the response signal R7, indicating that the SD card supports the PCIe mode, to the host, the host may perform the PCIe linkup process with the SD card. Based on the above disclosure, it can be understood that initialization processes of the subject invention are not limited to those depicted in FIGS. 7-9. Persons skilled in the art may derive other initialization processes based on the above disclosure, especially the disclosure related to FIG. 6.

Figure 10:
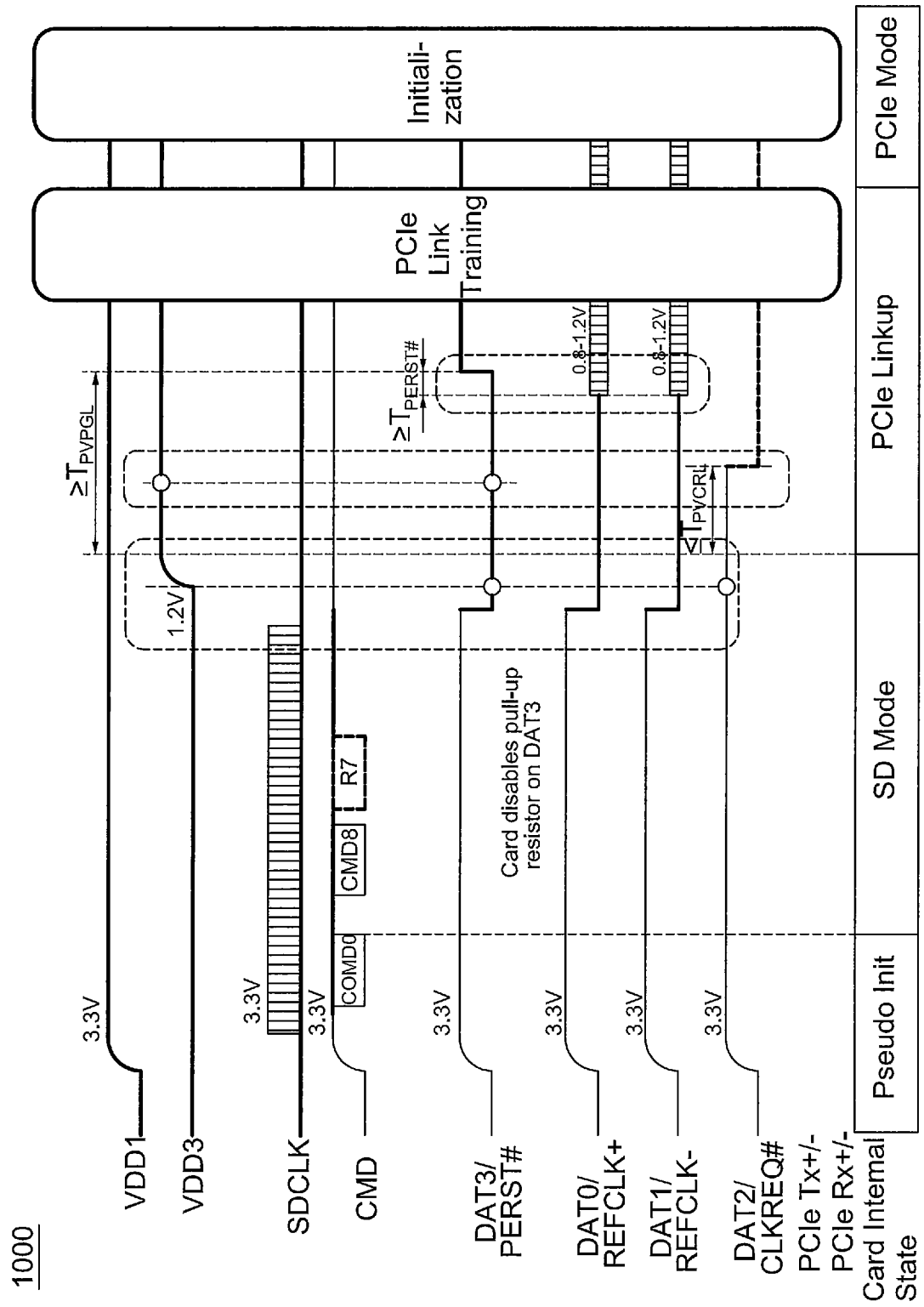
FIG. 10 illustrates an example of the sequence of the steps for initializing an SD card in accordance with some embodiments of the present invention.

FIG. 10 show an initialization process 1000 of the SD card B (or the controller 110) and the host H in accordance with some embodiments of the present invention. In the present embodiment, the process 1000 starts with an SD mode command, i.e., the CMD0 command sent by the host H. In a preferred embodiment, the process 1000 can be divided into four stages: pseudo initial stage, SD mode stage, PCIe linkup stage, and PCIe mode stage. Each of these stages is detailed as follows:

Pseudo Initial Stage:

SD card B (or the controller 110) is in the pseudo initial stage after being boosted up. In this stage, the host H turns on voltage VDD1 and pulls up command pin B2 and pins B1, B7, B8 and B9 (i.e., data lines DAT[3:0] in the SD mode; see FIG. 2) by a voltage of 3.3V. After voltage VDD1 is turned on, the host H transmits an SDCLX through clock pin B5 and the CMD0 command through command pin B2 to SD card B.

SD Mode Stage:

SD card B (or the controller 110) enters the SD mode after receiving CMD0 command. A CMD8 command is transmitted from the host H through command pin B2. The CMD8 command has "PCIe Avaliability"=1 and "PCIe 1.2V Support"=1 in its argument. Note that 1.2V is within the voltage range of 1.14V to 1.3V, of which the VDD3 pin B18 is configured to receive.

If SD card B receives the CMD8 command and detects "PCIe Avaliability"=1 and "PCIe 1.2V Support"=1 successfully, SD card B responds to R7 with "PCIe Response"=1 and "PCIe 1.2V Support"=1 because it supports VDD3 voltage supply in the present embodiment. In some embodiments, SD card B (or the controller 110) may support VDD2 voltage supply instead. When the host H detects "PCIe Response"=1 in R7, the host H drives pins B1, B7 and B8 low. Note that pins B1, B7 and B8 correspond to DAT3, DAT0 and DAT1 in the SD mode and correspond to PERST #, REFCLK+ and REFCLK− in the PCIe mode (see FIG. 4). In addition, when the host H detects "PCIe 1.2V Support"=1 in R7, PERST #=low and CLKREQ #=high, it supplies voltage VDD3 to SD card B (or the controller 110) through the VDD3 pin B18.

PCIe Linkup Stage:

SD card B (or the controller 110) enters the PCIe linkup process when the received voltage VDD3 reaches 1.2V. Note that pin B9 corresponds to DAT2 in the SD mode and corresponds to CLKREQ # in the PCIe mode (see FIG. 4). CLKREQ # is for a reference clock request signal.

When the SD card B (or the controller 110) detects that voltage VDD3 is on and PERST # is low, it disables an internal pull-up resistor on DAT3 and drives CLKREQ # low within a predetermined time interval TPVCRL since the received voltage VDD3 has become stable.

When the host H detects that CLKREQ # is low, it drives PERST # high after more than a predetermined time interval TPVPGL since the received voltage VDD3 has become stable and more than a predetermined time interval TPERST #-CLK since supplying REFCLK through the pins B7 and B8.

PCIe Mode Stage:

SD card B (or the controller 110) enters the PCIe mode after the PCIe linkup succeeds.

In summary, the initialization method provided by the present invention enables an SD card (or the controller 110) to support both the SD mode and the PCIe mode. The SD card (or the controller 110) may be initialized to the SD mode or the PCIe mode according to a host connected to the SD card (or the controller 110) based on different applications.

In view of the above, the present disclosure provides an initialization process for an SD card which supports both the SD mode and PCIe mode and a related memory card, controller and host. For the SD card according to the embodiments of the present disclosure, it is also compatible with a host which does not support the PCIe mode. For the host according to the embodiments of the present disclosure, it is also compatible with an SD card which does not support the PCIe mode.

The present disclosure may further be described using the following clauses:

1. A method performed by a secure digital (SD) card supporting both an SD mode and a peripheral component interconnect express (PCIe) mode for initializing the SD card, the SD card comprising at least 17 pins for coupling to a host, the at least 17 pins comprising:
   a first voltage supply pin for receiving a first supply voltage provided by the host;
   a second voltage supply pin for receiving a second supply voltage provided by the host, wherein the second supply voltage is lower than the first supply voltage;
   at least one ground pin for coupling to a ground;
   at least one clock pin for receiving a clock signal from the host; and
   a command pin for receiving a command from the host, the method comprising:
   (a) after receiving the first supply voltage through the first voltage supply pin from the host coupled to the SD card, entering the SD mode if the SD card is not in the PCIe mode and a CMD0 command for entering the SD mode is received through the command pin from the host coupled to the SD card; and
   (b) after receiving the first supply voltage through the first voltage supply pin from the host coupled to the SD card, performing a PCIe linkup process if the SD card is not in the SD mode and the second supply voltage is received through the second voltage supply pin from the host coupled to the SD card;
   wherein the SD card enters the PCIe mode if the PCIe linkup process succeeds.

2. The method of clause 1, wherein the SD card enters a Pseudo initialization state if a first supply voltage is provided; the SD card enters the SD mode from the Pseudo initialization state if the CMD0 command is received; and the SD card enters a state for performing the PCIe linkup process from the Pseudo initialization state if the second supply voltage is received.

3. The method of clause 1, further comprising the following steps to be executed after step (a):
   (d) receiving a CMD8 command for entering the PCIe mode transmitted by the host through the command pin;
   (e) transmitting a response signal, indicating that the SD card supports the PCIe mode, to the host through the command pin; and
   (f) after step (e), performing the PCIe linkup process if the second supply voltage is received through the second voltage supply pin from the host; otherwise, staying in the SD mode.

4. The method of clause 1, wherein step (b) further comprises terminating the PCIe linkup process if the SD card does not receive the second supply voltage through the second voltage supply pin.

5. The method of clause 1, further comprising switching out of the PCIe mode if the SD card does not receive the second supply voltage through the second voltage supply pin.

6. The method of clause 1, wherein the first supply voltage is within a range from 2.7 to 3.6 volts, and the second supply voltage is within a range from 1.7 to 1.95 volts or within a range from 1.14 to 1.3 volts.

7. The method of clause 1, wherein step (a) comprising one of the following:
   (g) entering the SD mode if the PCIe linkup process fails and the CMD0 command is received through the command pin from the host; and
   (h) entering the SD mode if the first supply voltage is received through the first voltage supply pin, the second supply voltage through the second voltage supply pin is absent, and the CMD0 command is received through the command pin from the host.

8. An SD card supporting both an SD mode and a PCIe mode comprising:
   at least 17 pins for coupling to a host, the at least 17 pins comprising:
   a first voltage supply pin for receiving a first supply voltage provided by the host;
   a second voltage supply pin for receiving a second supply voltage provided by the host, wherein the second supply voltage is lower than the first supply voltage;
   at least one ground pin for coupling to a ground;
   at least one clock pin for receiving a clock signal from the host; and
   a command pin for receiving a command from the host; and
   a controller,
   wherein the controller is configured to:
   after receiving the first supply voltage through the first voltage supply pin from the host coupled to the SD card, set the SD card to the SD mode if the SD card is not in the PCIe mode and a CMD0 command for entering the SD mode is received through the command pin from the host connected to the SD card; and
   after receiving the first supply voltage through the first voltage supply pin from the host coupled to the SD card, perform a PCIe linkup process if the SD card is not in the SD mode and the second supply voltage is received through the second voltage supply pin;
   wherein the SD card enters the PCIe mode if the PCIe linkup process succeeds.

9. The SD card of clause 8, wherein the SD card enters a Pseudo initialization state if a first supply voltage is provided; the SD card enters the SD mode from the Pseudo initialization state if the CMD0 command is received; and the SD card enters a state for performing the PCIe linkup process from the Pseudo initialization state if the second supply voltage is received.

10. The SD card of clause 8, wherein, after setting the SD card to the SD mode, the controller is further configured to:
receive a CMD8 command for entering the PCIe mode transmitted by the host through the command pin;
transmit a response signal, indicating that the SD card supports the PCIe mode, to the host through the command pin; and
after transmitting the response signal, perform the PCIe linkup process if the second supply voltage is received through the second voltage supply pin from the host; otherwise, keep the SD card in the SD mode.

11. The SD card of clause 8, wherein the controller is further configured to terminate the PCIe linkup process if the SD card does not receive the second supply voltage through the second voltage supply pin.

12. The SD card of clause 8, wherein the controller is further configured to:
switch the SD card out of the PCIe mode if the SD card does not receive the second supply voltage through the second voltage supply pin.

13. The SD card of clause 8, wherein the first supply voltage is within a range from 2.7 to 3.6 volts, and the second supply voltage is within a range from 1.7 to 1.95 volts or within a range from 1.14 to 1.3 volts.

14. The SD card of clause 8, wherein the controller is further configured to perform one of the following:
setting the SD card to the SD mode if the PCIe linkup process fails and the CMD0 command is received through the command pin from the host; and
setting the SD card to the SD mode if the first supply voltage is received through the first voltage supply pin, the second supply voltage through the second voltage supply pin is absent, and the CMD0 command is received through the command pin from the host.

15. A method performed by a host for initializing a secure digital (SD) card, the SD card supporting both an SD mode and a peripheral component interconnect express (PCIe) mode, the host comprising:
a processor;
a communication interface for coupling to the SD card, comprising:
a first voltage supply contact for providing a first supply voltage;
a second voltage supply contact for providing a second supply voltage lower than the first supply voltage;
at least one ground contact for coupling to a ground;
at least one clock contact for transmitting a clock signal to the SD card; and
a command contact for transmitting a command to the SD card,
the method comprising:
(a) providing the first supply voltage to the SD card through the first voltage supply contact;
(b) providing the second supply voltage to the SD card through the second voltage supply contact;
(c) performing a PCIe linkup process after step (b);
(d) determining that the PCIe linkup process succeeds or fails, wherein if the PCIe linkup process succeeds, the SD card enters the PCIe mode; and
(e) transmitting a CMD0 command for entering the SD mode to the SD card through the command contact if the PCIe linkup process fails.

16. The method of clause 15, further comprising:
(f) if the SD card is in the SD mode and a command requesting the SD card to enter the PCIe mode is received by the processor, transmitting a CMD8 command for entering the PCIe mode to the SD card through the command contact; and
wherein step (b) and step (c) are performed if a response signal, indicating that the SD card supports the PCIe mode, is received from the SD card through the command contact.

17. The method of clause 15, wherein the first supply voltage is within a range from 2.7 to 3.6 volts, and the second supply voltage is within a range from 1.7 to 1.95 volts or within a range from 1.14 to 1.3 volts.

18. The method of clause 15, further comprising:
(g) if a command requesting the SD card to enter the SD mode from the PCIe mode is received by the processor, stopping transmission of the second supply voltage and transmitting the CMD0 command to the SD card through the command contact.

19. A host for initializing a secure digital (SD) card, the SD card supporting both an SD mode and a peripheral component interconnect express (PCIe) mode, the host comprising:
a processor;
a communication interface for coupling to the SD card, comprising:
a first voltage supply contact for providing a first supply voltage;
a second voltage supply contact for providing a second supply voltage lower than the first supply voltage;
at least one ground contact for coupling to a ground, at least one clock contact for transmitting a clock signal to the SD card; and
a command contact for transmitting a command to the SD card;
wherein the host is configured to:
provide the first supply voltage to the SD card through the first voltage supply contact;
provide the second supply voltage to the SD card through the second voltage supply contact;
perform a PCIe linkup process after providing the second supply voltage;
determine that the PCIe linkup process succeeds or fails, wherein if the PCIe linkup process succeeds, the SD card enters the PCIe mode; and
transmit a CMD0 command for entering the SD mode to the SD card through the command contact if the PCIe linkup process fails.

20. The host of clause 19, wherein the processor is further configured to:
transmit a CMD8 command for entering the PCIe mode to the SD card through the command contact if the SD card is in the SD mode and a command requesting the SD card to enter the PCIe mode is received by the processor;
wherein if a response signal, indicating that the SD card supports the PCIe mode, is received from the SD card through the command contact, the processor is configured to provide the second supply voltage and perform the PCIe linkup process.

21. The host of clause 19, wherein the first supply voltage is within a range from 2.7 to 3.6 volts, and the second supply voltage is within a range from 1.7 to 1.95 volts or within a range from 1.14 to 1.3 volts.

22. The host of clause 19, wherein the processor further configured to:
stop transmitting the second supply voltage and transmit the CMD0 command to the SD card through the command contact if a command requesting the SD card to enter the SD mode from the PCIe mode is received.

23. A method performed by a host for initializing a secure digital (SD) card coupled to the host, the SD card supporting both an SD mode and a peripheral component interconnect express (PCIe) mode, the host comprising:
a processor;
a communication interface for coupling to the SD card, comprising:
a first voltage supply contact for providing a first supply voltage;
a second voltage supply contact for providing a second supply voltage lower than the first supply voltage;
at least one ground contact for coupling to a ground;
at least one clock contact for transmitting a clock signal to the SD card; and
a command contact for transmitting a command to the SD card,
the method comprising:
(a) providing the first supply voltage to the SD card through the first voltage supply contact;
(b) transmitting a CMD0 command for entering the SD mode through the command contact to the SD card after step (a);
(c) transmitting a CMD8 command for entering the PCIe mode through the command contact to the SD card after step (b), wherein the SD card remains in the SD mode if a response signal, indicating that the SD card supports the PCIe mode, is not received through the command contact from the SD card;
(d) if the response signal, indicating that the SD card supports the PCIe mode, is received from the SD card, providing the second supply voltage to the SD card through the second voltage supply contact;
(e) performing a PCIe linkup process after step (d);
(f) determining that the PCIe linkup process succeeds or fails, wherein if the PCIe linkup process succeeds, the SD card enters the PCIe mode; and
(g) if the PCIe linkup process fails, transmitting a CMD0 command to the SD card through the command contact.

24. The method of clause 23, wherein step (c) and step (d) are performed if the SD card is in the SD mode and a command requesting the SD card to enter the PCIe mode is received by the processor.

25. The method of clause 23, wherein the first supply voltage is within a range from 2.7 to 3.6 volts, and the second supply voltage is within a range from 1.7 to 1.95 volts or within a range from 1.14 to 1.3 volts.

26. The method of clause 23, further comprising:
(h) if a command requesting the SD card to enter the SD mode from the PCIe mode is received by the processor, stopping transmission of the second supply voltage and transmitting the CMD0 command to the SD card through the command contact.

27. A host for initializing a secure digital (SD) card, the SD card supporting both an SD mode and a peripheral component interconnect express (PCIe) mode, the host comprising:
a processor;
a communication interface for coupling to the SD card, comprising:
a first voltage supply contact for providing a first supply voltage;
a second voltage supply contact for providing a second supply voltage lower than the first supply voltage;
at least one ground contact for coupling to a ground;
at least one clock contact for transmitting a clock signal to the SD card; and
a command contact for transmitting a command to the SD card;
wherein the host is configured to:
provide the first supply voltage to the SD card through the first voltage supply contact;
transmit a CMD0 command for entering the SD mode through the command contact to the SD card after providing the first supply voltage;
transmit a CMD8 command for entering the PCIe mode through the command contact to the SD card after transmitting the CMD0 command, wherein the SD card remains in the SD mode if a response signal, indicating that the SD card supports the PCIe mode, is not received through the command contact from the SD card;
if the response signal, indicating that the SD card supports the PCIe mode, is received from the SD card, provide the second supply voltage to the SD card through the second voltage supply contact;
perform a PCIe linkup process after providing the second supply voltage;
determine that the PCIe linkup process succeeds or fails, wherein if the PCIe linkup process succeeds, the SD card enters the PCIe mode; and
if the PCIe linkup process fails, transmit a CMD0 command to the SD card through the command contact.

28. The host of clause 27, wherein if the SD card is in the SD mode and a command requesting the SD card to enter the PCIe mode is received by the processor, the CMD8 command is transmitted to the SD card through the command contact.

29. The host of clause 27, wherein the first supply voltage is within a range from 2.7 to 3.6 volts, and the second supply voltage is within a range from 1.7 to 1.95 volts or within a range from 1.14 to 1.3 volts.

30. The host of clause 27, wherein the processor is further configured to:
stop transmission of the second supply voltage and transmit the CMD0 command to the SD card through the command contact if a command requesting the SD card to enter the SD mode from the PCIe mode is received by the processor.

31. A method performed by a controller of a secure digital (SD) card supporting both an SD mode and a peripheral component interconnect express (PCIe) mode for initializing the SD card, the SD card comprising at least 17 pins for coupling to a host, and the at least 17 pins comprising:
a first voltage supply pin for receiving a first supply voltage for SD mode provided by the host;
a second voltage supply pin for receiving a second supply voltage provided by the host, wherein the second supply voltage is lower than the first supply voltage;
at least one ground pin for coupling to a ground;
at least one clock pin for receiving a clock signal from the host; and
a command pin for receiving a command from the host,
the method comprising:

(a) after receiving the first supply voltage through the first voltage supply pin, setting the SD card to the SD mode if the SD card is not in the PCIe mode and a CMD0 command for entering the SD mode is received through the command pin; and (b) after receiving the first supply voltage through the first voltage supply pin, letting the SD card perform a PCIe linkup process if the SD card is not in the SD mode and the second supply voltage is received through the second voltage supply pin; and (c) setting the SD card to the PCIe mode if the PCIe linkup process succeeds.

32. The method of clause 31, further comprising the following steps to be executed after step (a):

(d) receiving a CMD8 command for entering the PCIe mode through the command pin;

(e) transmitting a response signal, indicating that the SD card supports the PCIe mode, through the command pin; and (f) after step (e), letting the SD card perform the PCIe linkup process if the second supply voltage is received through the second voltage supply pin; otherwise, keeping the SD card in the SD mode.

33. The method of clause 31, wherein step (b) further comprises terminating the PCIe linkup process if the second supply voltage is not received through the second voltage supply pin.

34. The method of clause 31, further comprising setting the SD card to exit the PCIe mode if the second supply voltage is not received through the second voltage supply pin.

35. The method of clause 31, wherein the first voltage is within a range from 2.7 to 3.6 volts, and the second supply voltage is within a range from 1.7 to 1.95 volts or within a range from 1.14 to 1.3 volts.

36. The method of clause 31, wherein step (a) comprising one of the following:

(g) entering the SD mode if the PCIe linkup process fails and the CMD0 command is received through the command pin from the host; and (h) entering the SD mode if the first supply voltage is received through the first voltage supply pin, the second supply voltage through the second voltage supply pin is absent, and the CMD0 command is received through the command pin from the host.

37. A controller of a secure digital (SD) card, configured to perform the method of any one of clauses 31 to 36.

It should be noted that the above disclosure is for illustrative purposes and should not be deemed as limiting the present disclosure. Those skilled in the art will readily observe that numerous modifications and alterations of the device and method may be made while retaining the teachings of the present disclosure. Accordingly, the above disclosure should be construed as limited only by the metes and bounds of the appended claims.

What is claimed is:

1. A method performed by a host for initializing a secure digital (SD) card, the SD card supporting both an SD mode and a peripheral component interconnect express (PCIe) mode, the host comprising:
   a processor;
   a communication interface for coupling to the SD card, comprising:
   a first voltage supply contact for providing a first supply voltage;
   a second voltage supply contact for providing a second supply voltage lower than the first supply voltage, wherein the second voltage supply contact is separate and distinct from the first voltage supply contact;
   at least one ground contact for coupling to a ground;
   at least one clock contact for transmitting a clock signal to the SD card; and
   a command contact for transmitting a command to the SD card,
   the method comprising:
      (a) providing the first supply voltage to the SD card through the first voltage supply contact;
      (b) providing the second supply voltage to the SD card through the second voltage supply contact;
      (c) performing a PCIe linkup process after step (b);
      (d) determining that the PCIe linkup process succeeds or fails, wherein the PCIe linkup process is deemed to have failed if one of the following events happens and the PCIe linkup process is deemed to have succeeded if none of the events happen: (i) a response indicating that the PCIe linkup process succeeds is not received from the SD card within a predetermined time period; (ii) the second supply voltage is absent and (iii) a CMD0 command is received;
      (e) in response to determining that the PCIe linkup process succeeds, determining that the SD card enters the PCIe mode; and
      (f) in response to determining that the PCIe linkup process fails, transmitting a CMD0 command to the SD card through the command contact.

2. The method of claim 1, further comprising:
   (g) in response to the SD card being in the SD mode and a command requesting the SD card to enter the PCIe mode being received by the processor, transmitting a CMD8 command to the SD card through the command contact; and
   wherein upon receipt of a response signal, indicating that the SD card supports the PCIe mode, from the SD card through the command contact in response to the CMD8 command, step (c) and step (d) are performed again.

3. The method of claim 1, wherein the first supply voltage is within a range from 2.7 to 3.6 volts, and the second supply voltage is within a range from 1.7 to 1.95 volts or within a range from 1.14 to 1.3 volts.

4. The method of claim 1, further comprising:
   (h) in response to a command requesting the SD card to enter the SD mode from the PCIe mode being received by the processor, stopping transmission of the second supply voltage and transmitting the CMD0 command to the SD card through the command contact.

5. A method performed by a host for initializing a secure digital (SD) card coupled to the host, the SD card supporting both an SD mode and a peripheral component interconnect express (PCIe) mode, the host comprising:
   a processor;
   a communication interface for coupling to the SD card, comprising:
   a first voltage supply contact for providing a first supply voltage;
   a second voltage supply contact for providing a second supply voltage lower than the first supply voltage, wherein the second voltage supply contact is separate and distinct from the first voltage supply contact;
   at least one ground contact for coupling to a ground;
   at least one clock contact for transmitting a clock signal to the SD card; and a command contact for transmitting a command to the SD card,
   the method comprising:

(a) providing the first supply voltage to the SD card through the first voltage supply contact;
(b) transmitting a CMD0 command through the command contact to the SD card and/or a SDCLK through the clock contact coupled to the SD card for entering the SD mode after step (a);
(c) transmitting a CMD8 command through the command contact to the SD card after step (b);
(d) determining that the SD card remains in the SD mode in response to a response signal, indicating that the SD card supports the PCIe mode, is not received through the command contact from the SD card;
(e) providing the second supply voltage to the SD card through the second voltage supply contact upon receipt of the response signal, indicating that the SD card supports the PCIe mode, from the SD card;
(f) performing a PCIe linkup process after step (e);
(g) upon receipt of a response indicating that the PCIe linkup process succeeds from the SD card, determining that SD card enters the PCIe mode.

6. The method of claim 5, wherein step (e) and step (f) are performed in response to the SD card being in the SD mode and a command requesting the SD card to enter the PCIe mode being received by the processor.

7. The method of claim 5, wherein the first supply voltage is within a range from 2.7 to 3.6 volts, and the second supply voltage is within a range from 1.7 to 1.95 volts or within a range from 1.14 to 1.3 volts.

8. The method of claim 5, further comprising:
(h) upon receipt, by the processor, of a command requesting the SD card to enter the SD mode from the PCIe mode, stopping transmission of the second supply voltage and transmitting the CMD0 command through the command contact and/or the SDCLK through the clock contact to the SD card.

9. The method of claim 5, further comprising transmitting the CMD0 command to the SD card through the command contact in response to a failure of the PCIe linkup process.

10. A host for initializing a secure digital (SD) card, the SD card supporting both an SD mode and a peripheral component interconnect express (PCIe) mode, the host comprising:
a processor;
a communication interface for coupling to the SD card, comprising:
  a first voltage supply contact for providing a first supply voltage;
  a second voltage supply contact for providing a second supply voltage lower than the first supply voltage wherein the second voltage supply contact is separate and distinct from the first voltage supply contact;
  at least one ground contact for coupling to a ground;
  at least one clock contact for transmitting a clock signal to the SD card; and
  a command contact for transmitting a command to the SD card,
wherein the host is configured to:
  (a) provide the first supply voltage to the SD card through the first voltage supply contact;
  (b) provide the second supply voltage to the SD card through the second voltage supply contact;
  (c) perform a PCIe linkup process after step (b);
  (d) determine that the PCIe linkup process succeeds or fails, wherein the PCIe linkup process is deemed to have failed if one of the following events happens and the PCIe linkup process is deemed to have succeeded if none of the events happen: (i) a response indicating that the PCIe linkup process succeeds is not received from the SD card within a predetermined time period; (ii) the second supply voltage is absent; and (iii) a CMD0 command is received;
  (e) in response to determining that the PCIe linkup process succeeds, determine that the SD card enters the PCIe mode; and
  (f) in response to determining that the PCIe linkup process fails, transmit the CMD0 command to the SD card through the command contact.

11. The host of claim 10, wherein the host is further configured to:
(g) in response to the SD card being in the SD mode and a command requesting the SD card to enter the PCIe mode being received by the processor, transmit a CMD8 command to the SD card through the command contact; and
wherein upon receipt of a response signal, indicating that the SD card supports the PCIe mode, from the SD card through the command contact in response to the CMD8 command, step (c) and step (d) are performed again.

12. The host of claim 10, wherein the first supply voltage is within a range from 2.7 to 3.6 volts, and the second supply voltage is within a range from 1.7 to 1.95 volts or within a range from 1.14 to 1.3 volts.

13. The host of claim 10, wherein the host is further configured to:
(g) in response to a command requesting the SD card to enter the SD mode from the PCIe mode being received by the processor, stop transmission of the second supply voltage and transmitting the CMD0 command to the SD card through the command contact.

* * * * *